(12) United States Patent
Guo et al.

(10) Patent No.: US 7,773,346 B1
(45) Date of Patent: Aug. 10, 2010

(54) SLIDER THAT DYNAMICALLY ADJUSTS THE HEAD-TO-DISK SPACING IN A DISK DRIVE

(75) Inventors: Wei Guo, Fremont, CA (US); Jifang Tian, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1050 days.

(21) Appl. No.: 11/375,169

(22) Filed: Mar. 14, 2006

Related U.S. Application Data (60) Provisional application No. 60/709,535, filed on Aug. 19, 2005.

(51) Int. Cl.
G11B 5/60 (2006.01)
(52) U.S. Cl. .................................. 360/294.4
(58) Field of Classification Search .................. None
See application file for complete search history.

(56) References Cited

U.S. PATENT DOCUMENTS

| | | | |
|---|---|---|---|
| 5,421,943 A | 6/1995 | Tam et al. | |
| 5,862,015 A | 1/1999 | Evans et al. | |
| 5,880,626 A | 3/1999 | Dean | |
| 5,880,899 A | 3/1999 | Biachek et al. | |
| 5,959,801 A | 9/1999 | Gillis et al. | |
| 5,965,840 A | 10/1999 | Nagarajan et al. | |
| 5,991,113 A | 11/1999 | Meyer et al. | |
| 6,011,239 A | 1/2000 | Singh et al. | |
| 6,195,219 B1 | 2/2001 | Smith | |
| 6,338,269 B1 * | 1/2002 | Burga et al. | 73/105 |
| 6,452,740 B1 | 9/2002 | Ghoshal | |
| 6,538,836 B1 | 3/2003 | Dunfield et al. | |
| 6,611,399 B1 * | 8/2003 | Mei et al. | 360/234.7 |
| 6,690,543 B2 * | 2/2004 | Kurita et al. | 360/234.7 |
| 6,735,036 B1 | 5/2004 | Olim | |

(Continued)

OTHER PUBLICATIONS

C.E. Yeack-Scranton, et al., "An Active Slider for Practical Contact Recording", IEEE Transactions on Magnetics, 1990, V. 26, No. 5, San Jose, CA 95120.

(Continued)

*Primary Examiner*—Mark Blouin
(74) *Attorney, Agent, or Firm*—Mikel R. Boeve (57) ABSTRACT

A disk drive includes a drive circuitry, a storage disk and a slider. The storage disk has a data surface, and the slider magnetically interacts with the storage disk to transmit a signal between the storage disk and the drive circuitry. The slider includes a leading surface, an opposed trailing surface, a data transducer positioned near the trailing surface, and a piezoelectric element. The piezoelectric element receives a driving voltage from the drive circuitry to adjust a distance between the data transducer and the data surface. The piezoelectric element can form a portion of the trailing surface. The slider includes a slider body that forms a portion of the trailing surface, and a portion of the piezoelectric element can be coplanar with the portion of the trailing surface formed by the slider body. Further, at least a portion of the piezoelectric element can be constrained by the slider body. The piezoelectric element can include an exposed surface that is substantially parallel with the leading surface. The slider body can have an element cavity that completely receives the piezoelectric element. In one embodiment, the piezoelectric element has only one substantially planar exposed surface.

26 Claims, 9 Drawing Sheets

U.S. PATENT DOCUMENTS

| | | |
|---|---|---|
| 6,768,610 B1 | 7/2004 | Morris et al. |
| 6,870,709 B2 * | 3/2005 | Shimanouchi et al. ... 360/294.4 |
| 2001/0030822 A1 | 10/2001 | Boutaghou et al. |
| 2002/0067565 A1 | 6/2002 | Kelemen |
| 2002/0097528 A1 | 7/2002 | Williams et al. |
| 2003/0174430 A1 | 9/2003 | Takahashi et al. |

OTHER PUBLICATIONS

U.S. Appl. No. 10/211,671, Dynamically Adjustable Head Disk Spacing Slider Using Thermal Expansion, McKenzie, et al., filed Aug. 2, 2002.

* cited by examiner

SLIDER THAT DYNAMICALLY ADJUSTS THE HEAD-TO-DISK SPACING IN A DISK DRIVE

RELATED APPLICATION

This application claims the benefit on U.S. Provisional Application Ser. No. 60/709,535 filed on Aug. 19, 2005. The contents of U.S. Provisional Application Ser. No. 60/709,535 are incorporated herein by reference.

BACKGROUND

Disk drives are widely used in computers, consumer electronics and data processing systems for storing information in digital form. The disk drive typically includes one or more storage disks and one or more head gimbal assemblies. Each head gimbal assembly includes a slider having an air bearing surface, and a data transducer that transfers information to and from the storage disk. The rotation of the storage disk causes the slider to ride on an air bearing so that the data transducer is at a distance from the storage disk that is referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the data transducer and/or the storage disk, as well as loss of data. Thus, the range between head-to-disk contact and a desirable head-to-disk spacing has become extremely small, requiring an increasingly more accurate control system.

During in-situ usage of the disk drive, the temperature of the slider typically varies. For example, during a write operation, the electrical resistance of the write element generates heat in and around the data transducer, resulting in thermal expansion of the write pole tips toward the storage disk. The situation is commonly referred to a write pole tip protrusion ("WPTP"). If the WPTP is too extensive, the slider can unintentionally contact the storage disk (head-to-disk contact), causing off-track writing, damage to the slider and/or damage to the storage disk. Conversely, during read operations, the temperature of the slider can be somewhat lower, resulting in less thermal expansion and a greater head-to-disk spacing. Under this circumstance, reading errors can occur due to the increased head-to-disk spacing.

SUMMARY

The present invention is directed toward a disk drive including a drive circuitry, a storage disk and a slider having a data transducer. The storage disk has a data surface, and the data transducer magnetically interacts with the storage disk to transmit a signal between the storage disk and the drive circuitry. In one embodiment, the slider includes a leading surface, an opposed trailing surface, a data transducer positioned near the trailing surface, and a piezoelectric element. In this embodiment, the piezoelectric element forms a portion of the trailing surface. Further, the piezoelectric element receives a driving voltage from the drive circuitry to adjust a distance between the data transducer and the data surface.

In one embodiment, the slider includes a slider body that forms a portion of the trailing surface, and a portion of the piezoelectric element is coplanar with the portion of the trailing surface formed by the slider body. In an alternative embodiment, at least a portion of the piezoelectric element is not coplanar with the portion of the trailing surface formed by the slider body. Further, in another embodiment, at least a portion of the piezoelectric element is constrained by the slider body. For example, the piezoelectric element can have two opposing surfaces that are constrained by the slider body. Alternatively, the piezoelectric element can have two opposing pairs of surfaces that are constrained by the slider body. In some embodiments, the piezoelectric element includes a first volume that is constrained by the slider body and a second volume that is unconstrained by the slider body. In one such embodiment, the ratio of the first volume to the second volume is at least approximately 0.05.

In another embodiment, the piezoelectric element includes an exposed surface that is substantially parallel with the leading surface. Further, the piezoelectric element can include a first exposed surface and a perpendicular second exposed surface. The slider body can also include a bottom surface that faces the storage disk and a top surface that is opposite the bottom surface. In this embodiment, at least a portion of the first exposed surface can be substantially coplanar with the top surface. In another embodiment, the slider body has an element cavity that completely receives the piezoelectric element. In one such embodiment, the piezoelectric element has only one substantially planar exposed surface.

In yet another embodiment, the slider includes a piezoelectric element supporter having a modulus of elasticity of less than that of the slider body and/or the piezoelectric element. In this embodiment, the piezoelectric element supporter is positioned between the slider body and the piezoelectric element and/or the data transducer. Further, in this embodiment, the piezoelectric element may or may not have one or more exposed surfaces.

The present invention is also directed toward one or more methods for adjusting the distance between a data transducer and a data surface of the storage disk in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
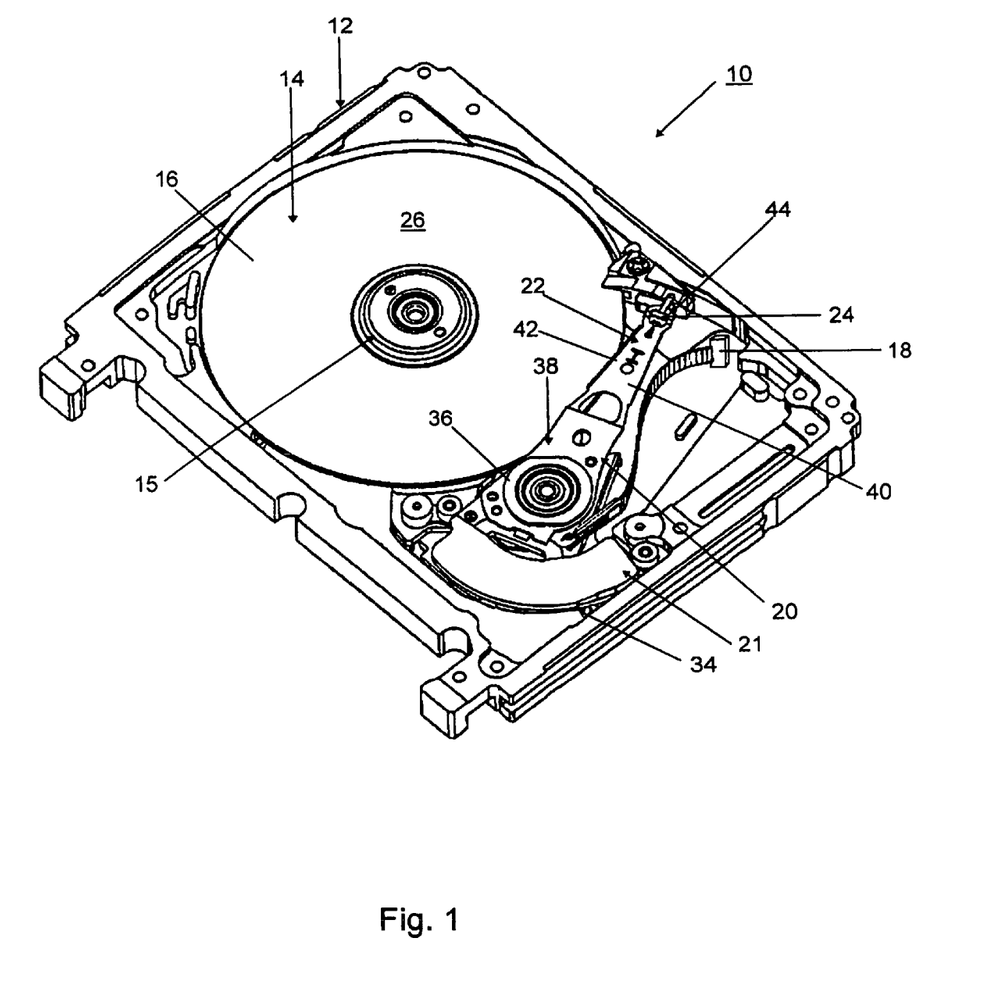
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head gimbal assemblies 22, with each head gimbal assembly 22 including a slider 24.

Each storage disk 16 includes one or more disk surfaces 26 that each has a plurality of concentric data tracks (not shown) that store data, including a target track that can be any of the data tracks. Data is read from the storage disk 16 during a read operation and data is transferred to the storage disk 16 during a write operation. The read and write operations can each include a seek mode during which the actuator assembly 21 rapidly moves the slider 24 to near the center of the target track. The read and write operations can also include a settle mode which commences once the slider 24 is positioned proximate the target track. Further, the read and write operations include a track following mode once the slider 24 has settled or stabilized over the target track. Additionally, once the slider 24 stabilizes over the target track, the read and/or write operations include the transfer of data between the slider 24 and the storage disk 16.

The drive circuitry 18 sends electrical signals and/or a driving voltage to and/or receives electrical signals from the slider 24 before, during and after read and/or write operations of the disk drive 10. Moreover, the drive circuitry 18 can control several additional functions within the disk drive 10. As provided herein, the drive circuitry 18 can receive electrical signals from the slider 24 and/or other components of the disk drive 10, which can be used to detect contact between the slider 24 and the storage disk 16. Further, the drive circuitry 18 can direct a driving voltage to the slider 24 to dynamically adjust and control the spacing between portions of the slider 24 and the storage disk 16.

The drive circuitry 18 can be included in a printed circuit board assembly (not shown). Further, the drive circuitry 18 can include one or more preamplifiers that can adjust and/or amplify the electrical signals that are transmitted between the slider 24 and other components of the drive circuitry 18. In one embodiment, the drive circuitry 18 is secured to and/or enclosed by the drive housing 12.

The head stack assembly 20 illustrated in FIG. 1 also includes an actuator motor 34, an actuator pivot 36, one head gimbal assembly 22, and an actuator arm 38. The actuator motor 34 rotates the actuator arm 38 and the head gimbal assembly 22 relative to the storage disk 16. The head stack assembly 20, alternately, can include a plurality of actuator arms 38 that each supports up to two head gimbal assemblies 22. Each head gimbal assembly 22 includes one slider 24 and a suspension 40 having a load beam 42 and a flexure 44. The suspension 40 is secured to the actuator arm 38, and supports the slider 24 proximate one of the disk surfaces 26 of the storage disk 16.

The slider 24 transfers information between the drive circuitry 18 and the storage disk 16. The design of the slider 24 can vary pursuant to the teachings provided herein. Further, various embodiments of disk drives and sliders are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Additionally, as provided in greater detail below, the drive circuitry selectively directs a driving voltage to the slider 24 to control movement of certain regions of the slider 24 at various times relative to reading data from and/or writing data to the storage disk 16. The controlled movement is used to dynamically adjust the head-to-disk spacing of the slider 24 as provided herein, and as described in co-pending U.S. patent application Ser. No. 11/101,298, filed by Schreck, et al. on Apr. 7, 2005, and assigned to Maxtor Corporation. The contents of U.S. patent application Ser. No. 11/101,298 are incorporated herein by reference.

Figure 2A:
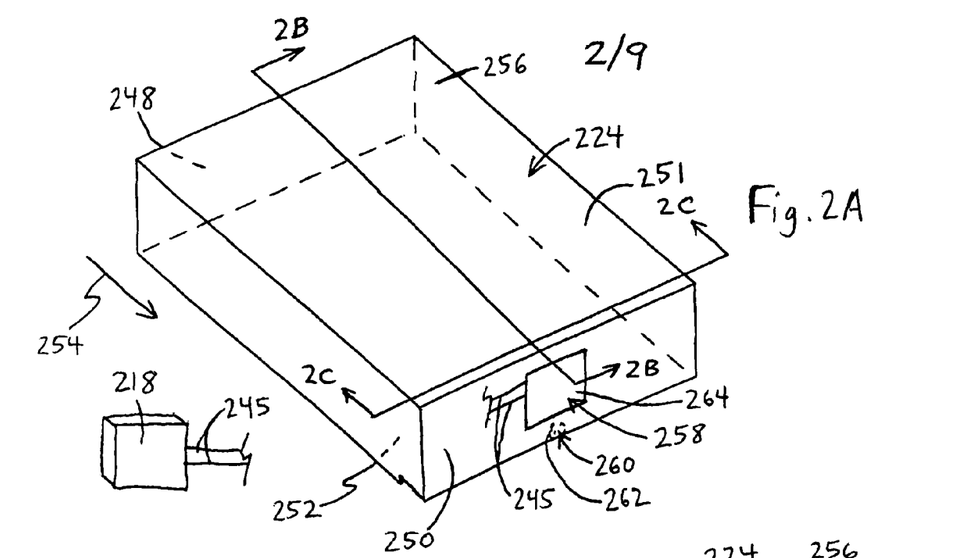
FIG. 2A is a perspective view of a drive circuitry and a first embodiment of a slider having features of the present invention.

FIG. 2A illustrates a perspective view of the drive circuitry 218 and a first embodiment of the slider 224. The drive circuitry 218 includes one or more conductors 245 that conduct electrical signals to and from the slider 224.

The slider 224 includes a leading surface 248 (shown in phantom), an opposed trailing surface 250, and a bottom surface 252 (shown in phantom), which forms an air bearing surface (ABS) that generally faces the storage disk 16 (illustrated in FIG. 1) during reading and/or writing operations. As used herein, during normal operation, a point on a rotating storage disk 16 will generally follow the direction of arrow 254 in FIG. 2A. More specifically, a point on the rotating storage disk 16 will pass beneath (or above) the leading surface 248 of the slider 224, then along the length of the slider 224 before passing beneath (or above) the trailing surface 250 of the slider 224. Additionally, as used herein, the term "trailing surface" can be a planar surface, or it can include a plurality of coplanar and/or non-coplanar, continuous or discontinuous surfaces that together form a back end of the slider 224.

Further, the slider 224 includes a slider body 256, a piezoelectric element 258 that is secured to the slider body 256, and a data transducer 260 (shown in phantom in FIG. 2A) that is also secured to the slider body 256. The slider body 256 includes a substantially planar top surface 251 and the data transducer 260 magnetically interacts with the storage disk 16 to read information from or write information to the storage disk 16. The materials used to form the slider body 256 can vary. For example, the slider body 256 can be substantially formed from ceramic materials and/or various alloys, such as alumina and titanium-carbide, for instance. It is recognized that any other suitable material known to those skilled in the art can be used to form the slider body 256, however.

The data transducer 260 includes a write element 262 (shown in phantom in FIG. 2A). Although the write element 262 is shown substantially centrally positioned near the trailing surface 250 of the slider 224, the write element 262 can be positioned off-center at or near the trailing surface 250. Moreover, in the embodiments provided herein, the trailing surface 250 is bounded by the top surface 251 and the bottom surface 252 of the slider 224.

In FIG. 2A, the conductors 245 are connected to the piezoelectric element 258 of the slider 224 so that electrical signals can be transmitted between the drive circuitry 218 and the piezoelectric element 258. It is recognized that the conductors 245 illustrated in FIG. 2A are shown in a cutaway fashion, and that one or more structures (not shown) may be positioned along the path of the conductors 245 between the drive circuitry 218 and the piezoelectric element 258, such as a preamplifier, as one non-exclusive example.

Additionally, as provided herein, the piezoelectric element 258 includes one or more exposed surfaces 264. As used herein, the term "piezoelectric element" includes any type of single or multi-layered PZT, PVDF, etc.

Further, as used herein, the term "exposed surface" refers to any surface of the piezoelectric element 258 that is substantially not covered by another structure. In other words, the exposed surface 264 of the piezoelectric element 258 is substantially visible without removing any other structures.

Figure 2B:
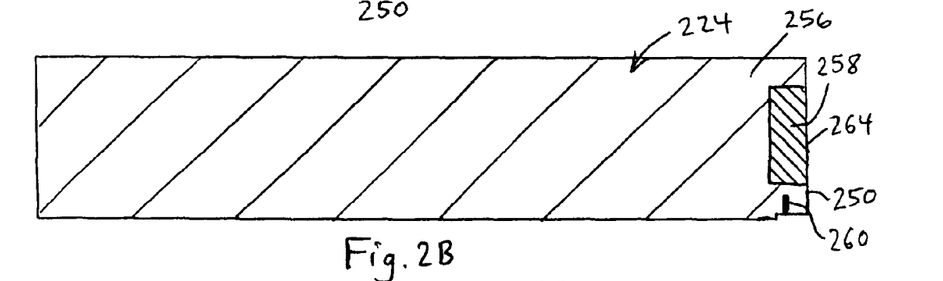
FIG. 2B is a cross-sectional view of the slider taken on line 2B-2B in FIG. 2A.

FIG. 2B is a cross-sectional view of the slider 224 taken on line 2B-2B in FIG. 2A, while essentially no driving voltage is being directed to the piezoelectric element 258. In this and other embodiments, the positioning of the piezoelectric element 258 can be varied. In FIG. 2B, the slider 224 includes one piezoelectric element 258 that is positioned near the data transducer 260. More specifically, in this embodiment, the piezoelectric element 258 includes one exposed surface 264, and is positioned on the slider body 256 so that the exposed surface 264 is substantially flush with the trailing surface 250 of the slider 224. Stated another way, the exposed surface 264 is coplanar with the remainder of the trailing surface 250 of the slider 224. In this embodiment, the piezoelectric element 258 is generally rectangular in shape, and five of the six surfaces of the piezoelectric element 258 are unexposed. Further, in this embodiment, five of the six surfaces of the piezoelectric element 258 are substantially constrained by the material of the slider body 256.

Thus, expansion and/or movement of the piezoelectric element 258 results in a direct force upon the material of the slider body 256 adjacent to the piezoelectric element 258. Because of the positioning of the unconstrained, exposed surface 264, a greater degree of deformation of the slider 224 can be targeted toward strategic locations on the slider body 256, which can effectuate the desired extent of adjustment of the head-to-disk spacing. For example, a greater degree of resultant movement can occur at or near the trailing surface 250, i.e. near the data transducer 260, than further inward from the trailing surface 250. Consequently, less driving voltage is required to be directed to the piezoelectric element 258, thereby conserving power and decreasing heat generated within the disk drive.

In the embodiment illustrated in FIG. 2B, the piezoelectric element 258 is not in direct electrical communication with the write element 260. Stated another way, the piezoelectric element 258 can be substantially electrically isolated from the write element 260, e.g. the piezoelectric element 258 is not in direct electrical contact with the write element 260. In an alternative embodiment, the piezoelectric element 258 and the write element 260 can be electrically coupled, or they can be directly connected.

Figure 2C:
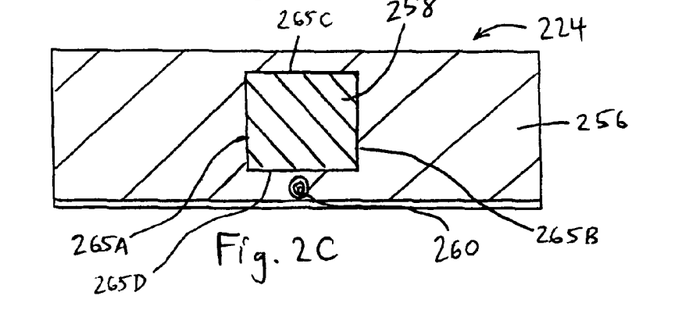
FIG. 2C is cross-sectional view of the slider taken on line 2C-2C in FIG. 2A.

FIG. 2C is a cross-sectional view of the slider 224 taken on line 2C-2C in FIG. 2A, illustrating the slider 224 at a point just slightly toward the leading surface 248 (illustrated in FIG. 2A) from the trailing surface 250 (illustrated in FIG. 2B). The slider 224 in FIG. 2C is shown while essentially no voltage is being directed to the piezoelectric element 258. In this embodiment, the slider 224 includes the slider body 256, the data transducer 260 and the piezoelectric element 258. In this and other embodiments, the piezoelectric element 258 is positioned near the data transducer 260 so that movement of the piezoelectric element 258 can have a greater impact on movement of the data transducer 260 relative to the storage disk 16 (illustrated in FIG. 1), e.g., a greater range of movement of the data transducer 260.

The piezoelectric element 258 also includes two or more opposed surfaces that are constrained by the slider body 256. For example, in the embodiment illustrated in FIG. 2C, the piezoelectric element includes a first pair of constrained opposing surfaces 265A, 265B, and a second pair of constrained opposing surfaces 265C, 265D. It is understood that although these opposing surfaces are illustrated in FIG. 2C as lines, they are actually planar surfaces that extend into and/or out of the page.

Figure 2D:
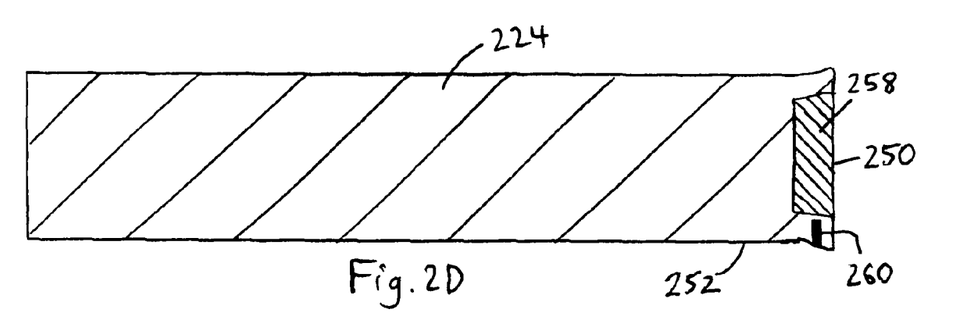
FIG. 2D is a cross-sectional view of the slider taken on line 2B-2B of the slider illustrated in FIG. 2A, after a driving voltage has been directed to a piezoelectric element of the slider.
Figure 2E:
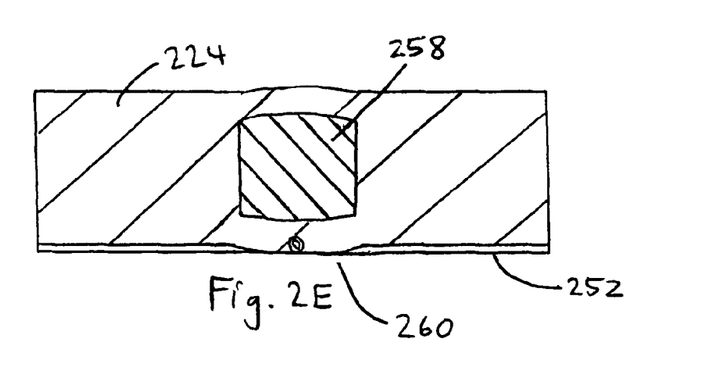
FIG. 2E is a cross-sectional view of the slider taken on line 2C-2C of the slider illustrated in FIG. 2A, after a driving voltage has been directed to the piezoelectric element of the slider.

FIGS. 2D and 2E are cross-sectional views of the slider 224 taken on lines 2B-2B and 2C-2C, respectively, while the driving voltage is being directed to the piezoelectric element 258. The piezoelectric element 258 is designed to expand upon an increase of voltage from the drive circuitry 218 (illustrated in FIG. 2A), or contract upon a decrease in voltage from the drive circuitry 218. Alternatively, displacement of the piezoelectric element 258 can change between expansion and contraction based on a change in polarity of the electric field directed by the drive circuitry 218 to the piezoelectric element 258.

Expansion and/or contraction of the piezoelectric element 258 results in deformation of a portion of the slider 224 in a direction that is substantially parallel to the trailing surface 250. In one embodiment, the piezoelectric element 258 is sized and positioned so that this deformation occurs primarily in a direction toward or away from the bottom surface 252. Because the piezoelectric element 258 is positioned at or near the trailing surface 250 of the slider 224, as is the data transducer 260, upon an increase in voltage, the data transducer 260 is moved toward the storage disk 16 (illustrated in FIG. 1), thereby decreasing the head-to-disk spacing. Conversely, upon a decrease in voltage, the data transducer 260 is moved away or retracted from the storage disk 16 (illustrated in FIG. 1), thereby increasing the head-to-disk spacing. The extent of this movement can be calibrated by methods known to those skilled in the art.

It is recognized that the distortion or deformation of the slider 224 as illustrated in FIGS. 2D and 2E is exaggerated for demonstrative purposes. The amount in which the piezoelectric element 258 can adjust the head-to-disk spacing will vary according to the amount of voltage directed to the piezoelectric element 258, the design of the slider 224 and the design of the piezoelectric element 258. By adjusting these and other parameters, in alternative non-exclusive embodiments, the drive circuitry 218 can direct a driving voltage to the piezoelectric element 258 to generate power to dynamically adjust the head-to-disk spacing by at least approximately 1, 2, 5, 10, 15, 20, 25 nm, or by amounts less than 1 nm or greater than 25 nm. Further, the level in which the drive circuitry 218 directs voltage to the piezoelectric element 258 will vary according to the design of the slider 224, the piezoelectric element 258, and the amount of head-to-disk spacing adjustment necessary.

In summary, prior to, during and/or following data transfer, the head-to-disk spacing can be dynamically maintained at the desired level. For example, during a write operation, because of pole tip protrusion, decreasing the voltage through the piezoelectric element 258 can maintain the head-to-disk spacing at a desired level. Alternatively, during a read operation when pole tip protrusion is typically decreased, increasing the voltage to the piezoelectric element 258 can maintain the head-to-disk spacing at the desired level. Once data transfer has been completed, the head-to-disk spacing can increase by reducing the voltage to the piezoelectric element 258, in order to decrease the likelihood of head-to-disk contact, which can cause damage to the disk drive 10. The foregoing representative examples are provided for ease of discussion only, and are not intended to limit the methods during which the present invention can be utilized. Any suitable application that requires adjustment of the head-to-disk spacing can benefit from use of the present invention.

During manufacturing, the slider 224 can include a plurality of different materials that are successively added in layers to form the components of the slider 224, including the piezoelectric element 258. For example, each layer can be added by electroplate deposition, sputtering, or other suitable methods known to those skilled in the art. In one embodiment, portions of the conductors 245, the data transducer 260 and the piezoelectric element 258 can be formed during the layering process.

The shape of the piezoelectric element 258 can vary to suit the design requirements of the slider 224 and the disk drive 10. The piezoelectric element 258 illustrated in at least some of the Figures has a substantially rectangular cross-section. Alternatively, the piezoelectric element 258 can have a different geometric configuration.

With the designs provided herein, deformation (expansion or contraction) of the piezoelectric element 258 causes movement (expansion or contraction) of the surrounding material of the slider body 256. This movement of the slider body 256 causes movement of the data transducer 260 relative to the storage disk. The embodiments of the sliders illustrated and described herein each causes movement of the data transducer 260 to varying degrees.

Figure 3A:
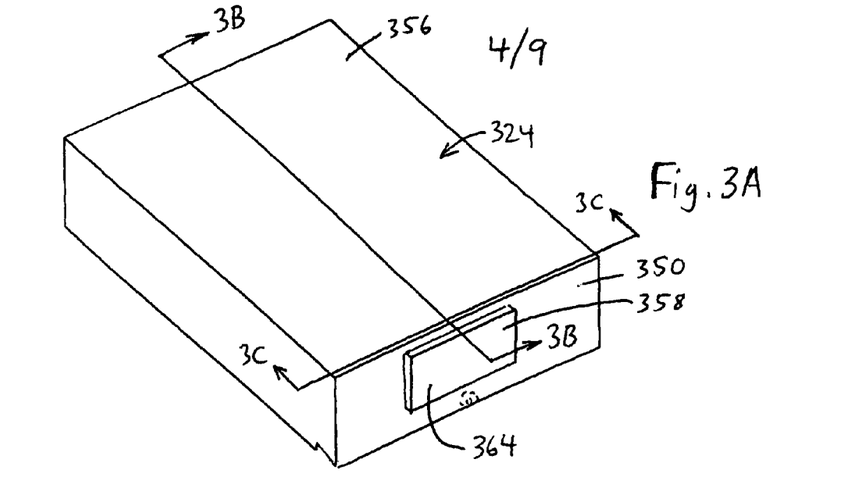
FIG. 3A is a perspective view of another embodiment of the slider.

FIG. 3A illustrates an alternative embodiment of the slider 324. In this embodiment, the piezoelectric element 358 extends away from the slider body 356 somewhat. Stated another way, the piezoelectric element 358 is generally rectangular shaped and has an exposed surface 364 that is substantially parallel but not coplanar with the remainder of the trailing surface 350 of the slider 324.

Figure 3B:
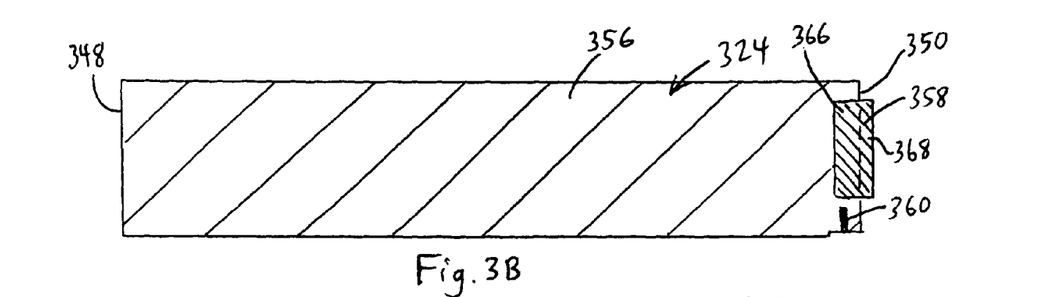
FIG. 3B is a cross-sectional view of the slider taken on line 3B-3B in FIG. 3A.

FIG. 3B is a cross-sectional view of the slider 324 taken on line 3B-3B in FIG. 3A. In this embodiment, the piezoelectric element 358 is positioned near the data transducer 360 so that movement of the piezoelectric element 358 can have a greater effect on movement of the data transducer 360 in a direction toward or away from the storage disk 16 (illustrated in FIG. 1). As shown in FIG. 3B, the piezoelectric element 358 extends both inwardly into the slider body 356, e.g., in a direction from the trailing surface 350 toward the leading surface 348, and outwardly away from the leading surface 348. Thus, in this embodiment, the piezoelectric element 358 includes a first region 366 (shown two-dimensionally in FIG. 3B) that is constrained by the slider body 356 and a second region 368 (shown two-dimensionally in FIG. 3B) that is unconstrained by the slider body 356. The first region 366 has a first volume and the second region 368 has a second volume. The ratio of the first volume to the second volume (separated by dashed line) of the piezoelectric element 358, and the positioning of each region 366, 368 can be tailored to suit the design requirements of the slider 324 in order to effectuate the desired level, i.e. extent and/or direction, of head-to-disk spacing adjustment. In non-exclusive alternative embodiments, the ratio of the first volume to the second volume is at least approximately 0.05, 0.10, 0.25, 0.50, 0.75, 0.90 or 0.95.

Figure 3C:
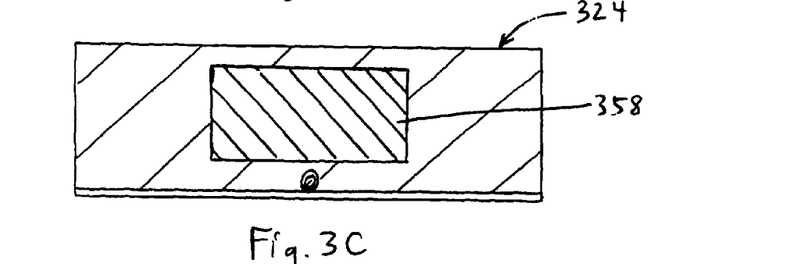
FIG. 3C is cross-sectional view of the slider taken on line 3C-3C in FIG. 3A.

FIG. 3C is a cross-sectional view of the slider 324 taken on line 3C-3C in FIG. 3A, illustrating the slider 324 at a point just slightly toward the leading surface 348 (illustrated in FIG. 3B) from the trailing surface 350 (illustrated in FIG. 3B). Although the slider 324 in FIG. 3C is shown with essentially no voltage being directed to the piezoelectric element 358, the effect of voltage to the piezoelectric element 358 would have a somewhat similar result as that illustrated in FIG. 2E, although the level of voltage required and the extent of the deformation may be somewhat different.

Figures 4A, 4B:
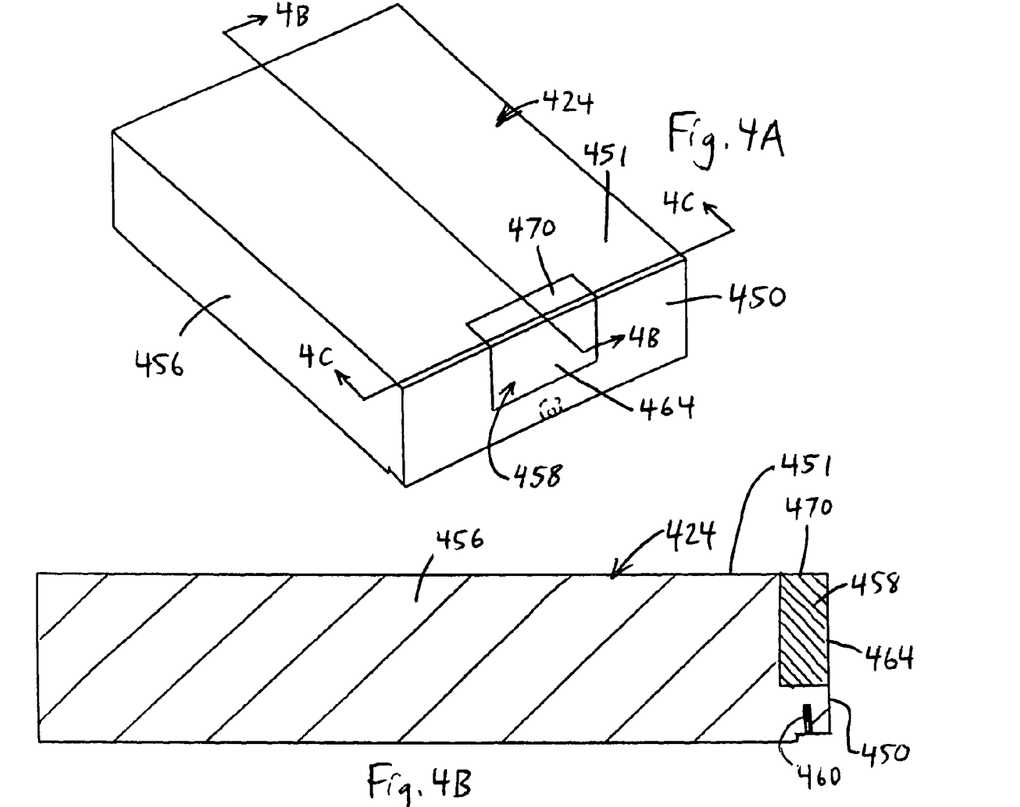
FIG. 4A is a perspective view of still another embodiment of the slider.
FIG. 4B is a cross-sectional view of the slider taken on line 4B-4B in FIG. 4A.

FIG. 4A illustrates another alternative embodiment of the slider 424. In this embodiment, the piezoelectric element 458 includes two unconstrained, exposed surfaces 464, 470. Stated another way, the piezoelectric element 458 has a first exposed surface 464 that is substantially parallel and coplanar with the remainder of the trailing surface 450 of the slider 424, and a second exposed surface 470 that is substantially perpendicular to the trailing surface 450 of the slider 424. In other words, the first exposed surface 464 and the second exposed surface 470 are substantially perpendicular to one another.

FIG. 4B is a cross-sectional view of the slider 424 taken on line 4B-4B in FIG. 4A. In this embodiment, the piezoelectric element 458 is positioned near the data transducer 460 so that movement of the piezoelectric element 458 can have a greater effect on movement of the data transducer 460 in a direction toward or away from the storage disk 16 (illustrated in FIG. 1). In this embodiment, the first exposed surface 464 is substantially flush with the remainder of the trailing surface 450, and the second exposed surface 470 is substantially flush with a top surface 451 of the slider body 456.

Figure 4C:
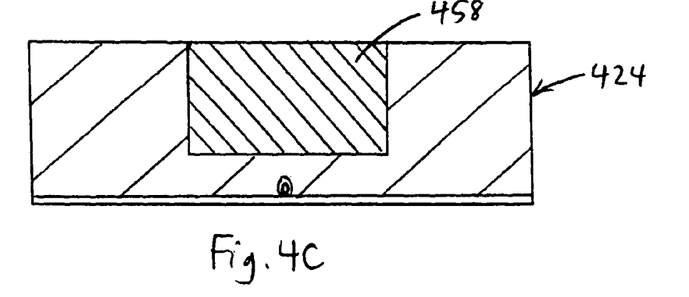
FIG. 4C is cross-sectional view of the slider taken on line 4C-4C in FIG. 4A.

FIG. 4C is a cross-sectional view of the slider 424 taken on line 4C-4C in FIG. 4A, illustrating the slider 424 at a point just slightly toward the leading surface from the trailing surface 450 (illustrated in FIG. 4B). Although the slider 424 in FIG. 4C is shown with essentially no driving voltage being directed to the piezoelectric element 458, the effect of voltage to the piezoelectric element 458 would have a somewhat similar result as that illustrated in FIG. 2E, although the level of voltage required and the extent of the deformation may vary somewhat.

Figure 5A:
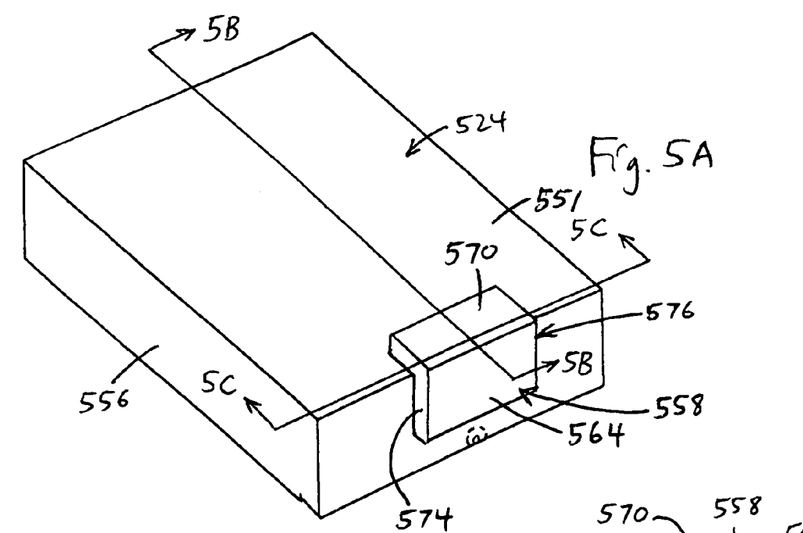
FIG. 5A is a perspective view of yet another embodiment of the slider.

FIG. 5A illustrates another alternative embodiment of the slider 524. In this embodiment, the piezoelectric element 558 includes at least four exposed surfaces 564, 570, 574, 576 that are substantially unconstrained. More specifically, in this embodiment, the piezoelectric element 558 has a first exposed surface 564 that is substantially parallel but not coplanar with the remainder of the trailing surface 550 of the slider 524, a second exposed surface 570 that is substantially parallel but not coplanar with the top surface 551 of the slider body 556. In other words, the first exposed surface 564 and the second exposed surface 570 can be substantially perpendicular to one another. In this embodiment, the piezoelectric element 558 extends above the level of the top surface 551 of the slider body 556.

Additionally, the piezoelectric element 558 includes a third exposed surface 574 and a fourth exposed surface 576 that is opposite the third exposed surface 574. In this embodiment, the third and fourth exposed surfaces 574, 576 are substantially L-shaped. However, it is recognized that the shape of the third and fourth exposed surfaces 574, 576 can differ from those illustrated in FIGS. 5A-5B.

Figure 5B:
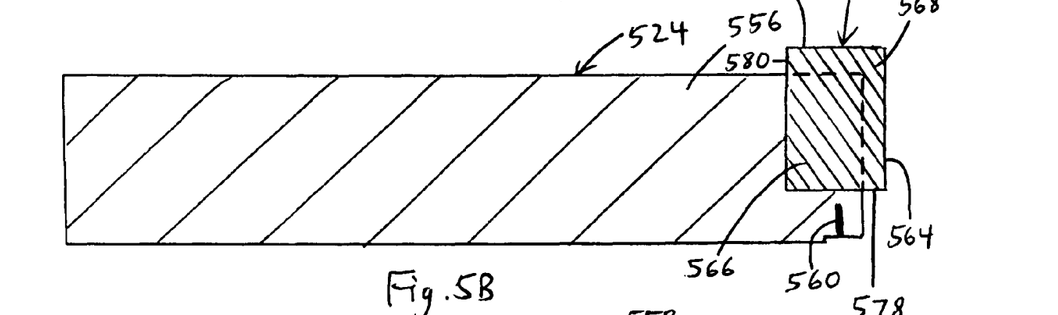
FIG. 5B is a cross-sectional view of the slider taken on line 5B-5B in FIG. 5A.

FIG. 5B is a cross-sectional view of the slider 524 taken on line 5B-5B in FIG. 5A. The piezoelectric element 558 is positioned near the data transducer 560 so that movement of the piezoelectric element 558 can have a greater effect on movement of the data transducer 560 in a direction toward or away from the storage disk 16 (illustrated in FIG. 1). In addition to the first through fourth exposed surfaces identified relative to FIG. 5A, FIG. 5B illustrates a fifth exposed surface 578 and a sixth exposed surface 580. In this embodiment, none of the exposed surfaces 564, 570, 574, 576, 578, 580 is flush with the slider body 556.

Further, in this embodiment, the piezoelectric element 558 includes a first region 566 (shown two-dimensionally in FIG. 5B) that is at least partially constrained by the slider body 556 and a second region 568 (shown two-dimensionally in FIG. 5B) that is unconstrained by the slider body 556. The first region 566 has a first volume and the second region 568 has a second volume. The proportion of first volume to second volume (separated by dashed line) of the piezoelectric element 558 can be tailored to suit the design requirements of the slider 524 in order to effectuate the desired level of head-to-disk spacing adjustment.

Figure 5C:
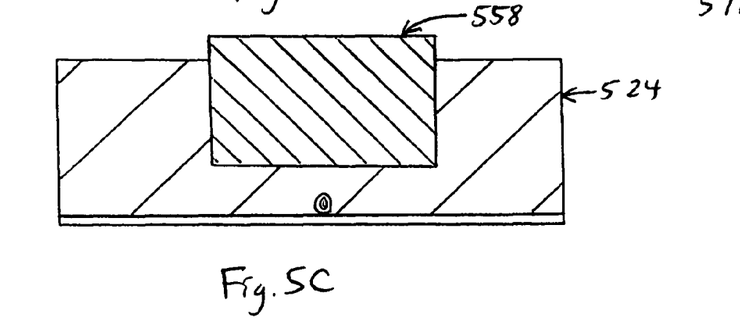
FIG. 5C is cross-sectional view of the slider taken on line 5C-5C in FIG. 5A.

FIG. 5C is a cross-sectional view of the slider 524 taken on line 5C-5C in FIG. 5A, illustrating the slider 524 at a point just slightly toward the leading surface from the trailing surface. Although the slider 524 in FIG. 5C is shown with essentially no voltage being directed to the piezoelectric element 558, the effect of voltage to the piezoelectric element 558 would have a somewhat similar result as that illustrated in FIG. 2E, although the level of voltage required and the extent of the deformation may vary somewhat.

Figure 6A:
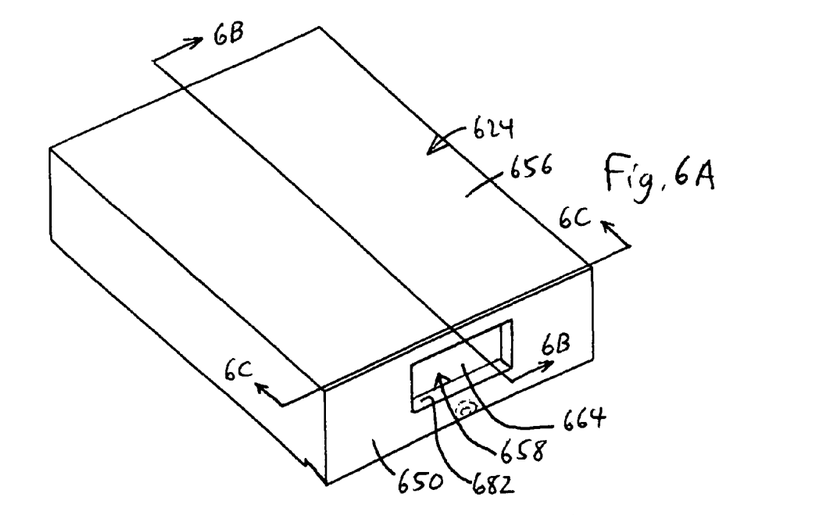
FIG. 6A is a perspective view of another embodiment of the slider.

FIG. 6A illustrates another alternative embodiment of the slider 624. In this embodiment, the piezoelectric element 658 includes one unconstrained, exposed surface 664 that is substantially parallel but not coplanar with the remainder of the trailing surface 650 of the slider 624. Further, the remainder of the surfaces of the piezoelectric element 658 are constrained by the material of the slider body 656. In this embodiment, the slider body 656 includes an element cavity 682 that receives the piezoelectric element 658.

Figure 6B:
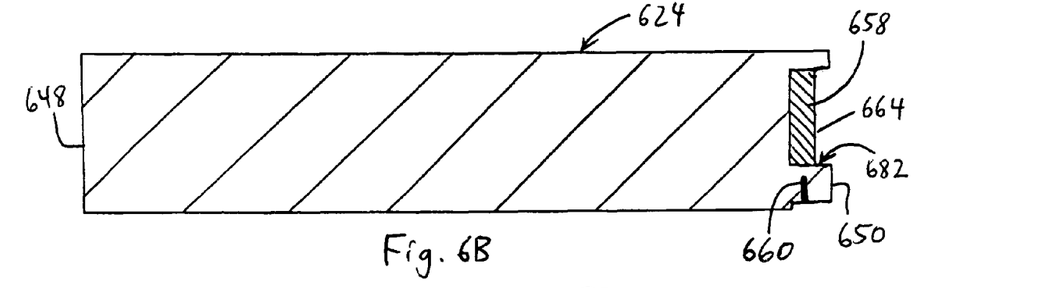
FIG. 6B is a cross-sectional view of the slider taken on line 6B-6B in FIG. 6A.

FIG. 6B is a cross-sectional view of the slider 624 taken on line 6B-6B in FIG. 6A. In this embodiment, the exposed surface 664 is inset from the remainder of the trailing surface 650 in a direction toward the leading surface 648. In other words, the piezoelectric element 658 is positioned within the element cavity 682 and is constrained on all sides with the exception of the exposed surface 664. The piezoelectric element 658 is positioned near the data transducer 660 so that movement of the piezoelectric element 658 can have a greater effect on movement of the data transducer 660 in a direction toward or away from the storage disk 16 (illustrated in FIG. 1).

Figure 6C:
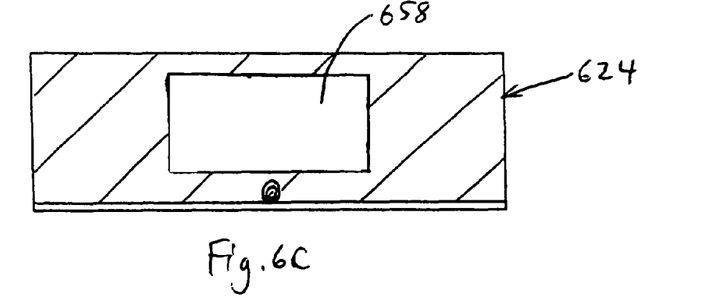
FIG. 6C is cross-sectional view of the slider taken on line 6C-6C in FIG. 6A.

FIG. 6C is a cross-sectional view of the slider 624 taken on line 6C-6C in FIG. 6A, illustrating the slider 624 at a point just slightly toward the leading surface 648 (illustrated in FIG. 6B) from the trailing surface 650 (illustrated in FIG. 6B). Although the slider 624 in FIG. 6C is shown with essentially no voltage being directed to the piezoelectric element 658, the effect of voltage to the piezoelectric element 658 would have a somewhat similar result as that illustrated in FIG. 2E, although the level of voltage required and the extent of the deformation may vary somewhat.

Figure 7A:
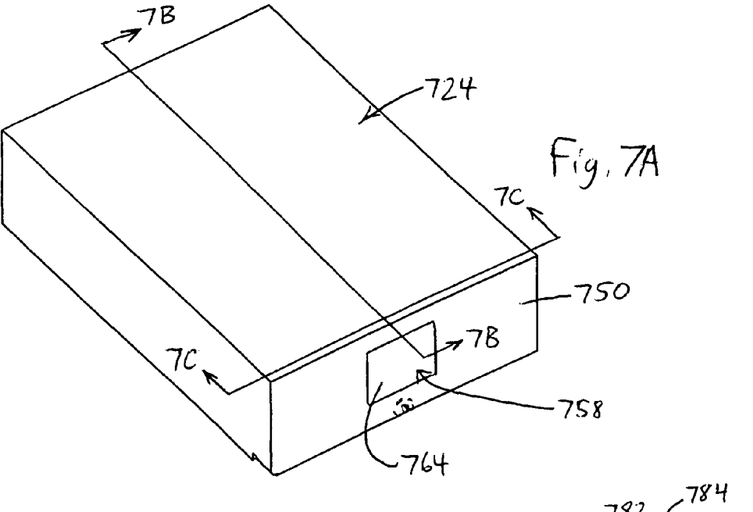
FIG. 7A is a perspective view of yet another embodiment of the slider.

FIG. 7A illustrates still another alternative embodiment of the slider 724. In this embodiment, the piezoelectric element 758 includes one unconstrained, exposed surface 764 that is substantially parallel and coplanar with the remainder of the trailing surface 750 of the slider 724.

Figure 7B:
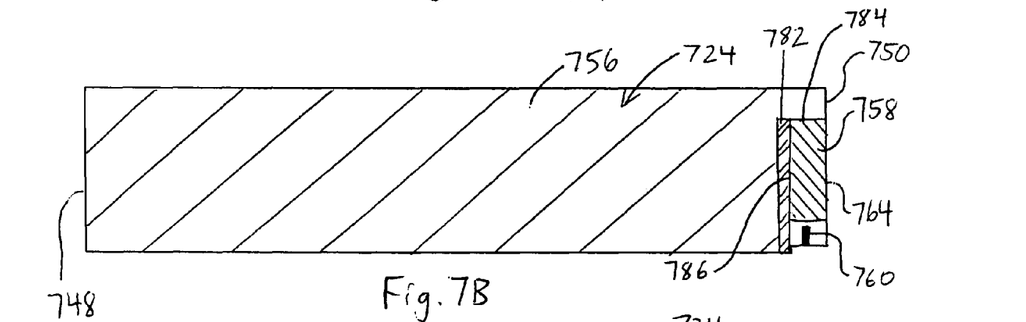
FIG. 7B is a cross-sectional view of the slider taken on line 7B-7B in FIG. 7A.

FIG. 7B is a cross-sectional view of the slider 724 taken on line 7B-7B in FIG. 7A, while essentially no driving voltage is being directed to the piezoelectric element 758. In this and other embodiments, the positioning of the piezoelectric element 758 can be varied. In FIG. 7B, the slider 724 includes one piezoelectric element 758 that is positioned near the data transducer 760. More specifically, in this embodiment, the piezoelectric element 758 includes one exposed surface 764, and is positioned so that the exposed surface 764 is substantially flush with the trailing surface 750 of the slider 724. In an alternative embodiment, the piezoelectric element 758 does not have any exposed surfaces.

In addition, in this embodiment, the slider 724 includes a piezoelectric element supporter 782 that is positioned directly between the piezoelectric element 758 and the slider body 756. In addition, the piezoelectric element supporter 782 can be positioned between the data transducer 760 and the slider body 756. In one embodiment, the piezoelectric element supporter 782 is formed substantially from a relatively soft material, such as a material having a modulus of elasticity that is less than that of the slider body 756. For example, in non-exclusive alternative embodiments, the modulus of elasticity of the material forming the piezoelectric element supporter 782 can be less than approximately 90%, 75%, 50%, 25%, 10% or 5% of the modulus of elasticity of the slider body 756.

In the alternative, or in addition, the piezoelectric element supporter 782 can be formed substantially from a material having a modulus of elasticity that is less than that of the piezoelectric element 758. For example, in non-exclusive alternative embodiments, the modulus of elasticity of the material forming the piezoelectric element supporter 782 can be less than approximately 90%, 75%, 50%, 25%, 10% or 5% of the modulus of elasticity of the piezoelectric element 758.

In this embodiment, the piezoelectric element 758 includes a first region 784 and a second region 786, as well as one or more remaining regions. As used herein, the first region 784 and/or the second region 786 can be one complete side, e.g. one contiguous surface, of the piezoelectric element 758, or a portion of one side or surface. In this embodiment, the first region 784 of the piezoelectric element 758 is secured or anchored to the slider body 756, and the second region 786 is secured to the piezoelectric element supporter 782. It is recognized that any surface or portion of a surface of the piezoelectric element 758 can be the first region 784 or the second region 786.

In the embodiment illustrated in FIG. 7B, the first region 784 is substantially opposite the data transducer 760. Further, in this embodiment, the second region 786 is oriented in the direction of greatest displacement of the piezoelectric element 758, although this orientation can be varied. Because the slider body 756 has a greater rigidity than the piezoelectric element supporter 782, displacement of the piezoelectric element 758 is greater in a direction away from the contact area between the first region 784 and the slider body 756, e.g., in a direction toward the data transducer 760. With this design, the potential displacement of the piezoelectric element 758 in the desired direction (toward and/or away from the data transducer 760) is increased, thereby having an increased effect on movement of the data transducer 760 in a direction toward or away from the storage disk 16 (illustrated in FIG. 1).

In general, the lower the modulus of elasticity of the material forming the piezoelectric element supporter 782, the greater the displacement will be of the piezoelectric element 758 in a direction along the piezoelectric element supporter 782. Greater displacement of the piezoelectric element 758 in this direction equates to a greater movement of the data transducer 760 toward or away from the storage disk 16 to adjust the head-to-disk spacing.

With these designs, the piezoelectric element 758 will exhibit greater expansion in the direction of the data transducer 760 when the driving voltage to the piezoelectric element 758 is increased. Conversely, the piezoelectric element 758 will exhibit less expansion (or greater contraction) in a direction away from the data transducer 760 when the driving voltage to the piezoelectric element 758 is decreased.

It is understood that the configuration and/or geometry of the piezoelectric element 758 and the piezoelectric element supporter 782 can vary from that illustrated in the Figures. For example, the piezoelectric element supporter 782 can be positioned on portions of two or more sides of the piezoelectric element 758. Further, the shape of the piezoelectric element supporter 782 can be substantially planar or it can be in multiple planes to partially envelope the piezoelectric element 758, for example.

Figure 7C:
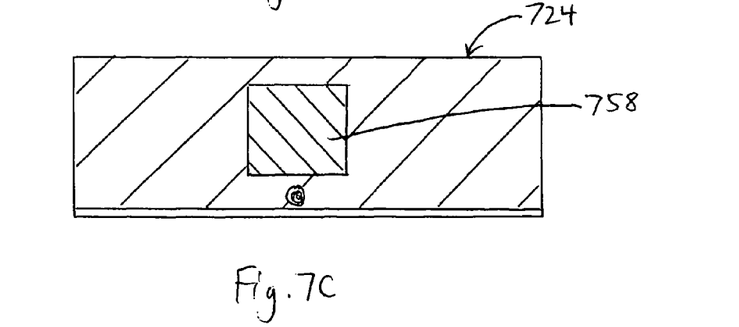
FIG. 7C is cross-sectional view of the slider taken on line 7C-7C in FIG. 7A.

FIG. 7C is a cross-sectional view of the slider 724 taken on line 7C-7C in FIG. 7A, illustrating the slider 724 at a point just slightly toward the leading surface 748 (illustrated in FIG. 7B) from the trailing surface 750 (illustrated in FIG. 7B). Although the slider 724 in FIG. 7C is shown with essentially no voltage being directed to the piezoelectric element 758, the effect of voltage applied to the piezoelectric element 758 would have a somewhat similar result as that illustrated in FIG. 2E, although the level of voltage required and the extent of the deformation may be somewhat different. For example, in this embodiment, the deformation of the piezoelectric element 758 would likely be less in the upward direction, and greater in the downward direction (toward the data transducer 760).

Figure 8A:
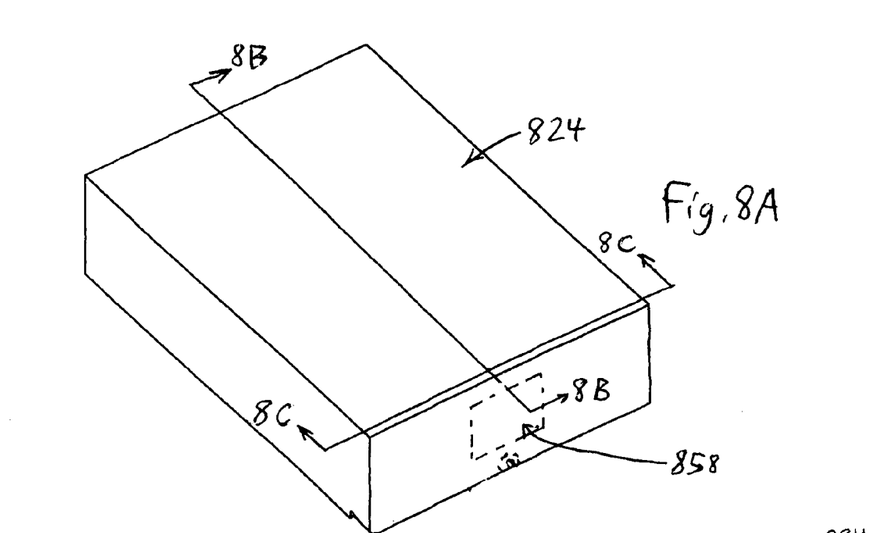
FIG. 8A is a perspective view of still another embodiment of the slider.

FIG. 8A illustrates another alternative embodiment of the slider 824 including a piezoelectric element 858 (illustrated in phantom in FIG. 8A). In this embodiment, the piezoelectric element 858 does not include any unconstrained, exposed surfaces 764 (illustrated in FIG. 7A). In other words, each side of the piezoelectric element 858 is bounded by other structures, as explained below.

Figure 8B:
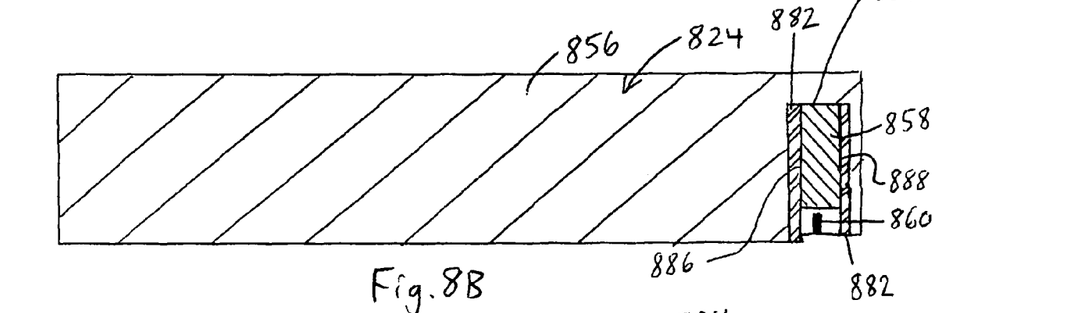
FIG. 8B is a cross-sectional view of the slider taken on line 8B-8B in FIG. 8A.

FIG. 8B is a cross-sectional view of the slider 824 taken on line 8B-8B in FIG. 8A, while essentially no driving voltage is being directed to the piezoelectric element 858. In this embodiment, the positioning of the piezoelectric element 858 can be varied. In FIG. 8B, the piezoelectric element 858 is positioned near the data transducer 860.

In addition, in this embodiment, the slider 824 includes one or more piezoelectric element supporters 882 (two piezoelectric element supporters 882 are illustrated in FIG. 8B) that are each positioned directly between the piezoelectric element 858 and portions of the slider body 856. In addition, one or more of the piezoelectric element supporters 882 can be positioned directly between the data transducer 860 and the slider body 856, as illustrated in FIG. 8B. In an alternative embodiment, only one of the piezoelectric element supporters 882 illustrated in FIG. 8B is present in the slider 824. Each of the piezoelectric element supporters 882 are formed substantially from a relatively soft material as previously described herein.

In this embodiment, the piezoelectric element 858 includes at least a first region 884, a second region 886 and a third region 888, as well as one or more remaining regions. At least a portion of the first region 884 of the piezoelectric element 858 is secured or anchored to the slider body 856. Further, in the embodiment illustrated in FIG. 8B, at least a portion of the second region 886 and a portion of the third region 888 are secured to one or more of the piezoelectric element supporters 882. In this embodiment, the piezoelectric element 858 is positioned directly between two piezoelectric element supporters 882. It is recognized that any of the region of the piezoelectric element 858 can be the first region 884, the second region 886 or the third region 888. For example, one or more other surfaces of the piezoelectric element 858 can be in contact with the piezoelectric element supporter(s) 882.

In the embodiment illustrated in FIG. 8B, the first region 884 is substantially opposite the data transducer 860. Further, in one embodiment, at least one of the second region 886 and the third region 888 are oriented along the direction of greatest displacement of the piezoelectric element 858, although this orientation can be varied. In the embodiment illustrated in FIG. 8B, both the second region 886 and the third region 888 are oriented along the direction of greatest displacement of the piezoelectric element 858. With this design, the potential displacement of the piezoelectric element 858 in the desired direction (toward and/or away from the data transducer 860) is increased, thereby having an increased effect on movement of the data transducer 860 in a direction toward or away from the storage disk 16 (illustrated in FIG. 1).

With these designs, the piezoelectric element 858 will exhibit greater expansion in the direction of the data transducer 860 when the driving voltage to the piezoelectric element 858 is increased. Conversely, the piezoelectric element 858 will exhibit less expansion (or greater contraction) in a direction away from the data transducer 860 when the driving voltage to the piezoelectric element 858 is decreased or reduced to zero.

Figure 8C:
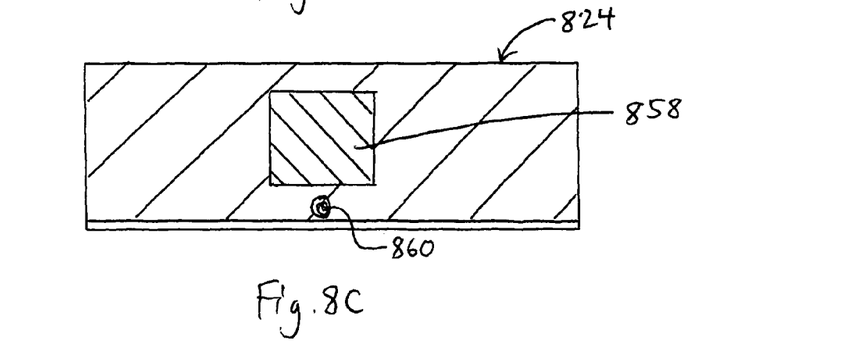
FIG. 8C is cross-sectional view of the slider taken on line 8C-8C in FIG. 8A.

FIG. 8C is a cross-sectional view of the slider 824 taken on line 8C-8C in FIG. 8A. Although the slider 824 in FIG. 8C is shown with essentially no voltage being directed to the piezoelectric element 858, the effect of voltage applied to the piezoelectric element 858 would have a somewhat similar result as that illustrated in FIG. 2E, although the level of voltage required and the extent of the deformation may be somewhat different. For example, in this embodiment, the deformation of the piezoelectric element 858 would likely be less in the upward direction, and greater in the downward direction (toward the data transducer 860).

It is recognized that in the foregoing embodiments, various types of piezoelectric elements can be used. For example, although the term "piezoelectric element" is used singularly herein, it is understood that a plurality of piezoelectric elements can be combined or "stacked", or that layers of piezoelectric elements can be arranged in a back and forth or serpentine configuration, for example.

Although the embodiments of the present invention provided herein have been presented as separate and distinct embodiments, it is recognized that various features from two or more embodiments can be combined to form additional, alternative embodiments that are not specifically illustrated or described. It is understood that presenting every possible embodiment which would include one or more features from a plurality of embodiments described herein would be onerous and impractical. However, this intentional omission is not intended to limit the scope of the present invention in any manner.

While the particular slider 24 and disk drive 10, as herein shown and disclosed in detail, is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A disk drive comprising:
   a drive circuitry;
   a storage disk having a data surface; and
   a slider including
   (i) a leading surface,
   (ii) an opposed trailing surface,
   (iii) a data transducer positioned near the trailing surface, the data transducer magnetically interacting with the storage disk, and
   (iv) a piezoelectric element entirely located on a trailing edge side of the slider that forms at least a portion of the trailing surface, the piezoelectric element receiving a driving voltage from the drive circuitry to adjust a distance between the data transducer and the data surface.

2. The disk drive of claim 1 wherein the slider includes a slider body that forms a portion of the trailing surface, and wherein at least a portion of the piezoelectric element is coplanar with the portion of the trailing surface formed by the slider body.

3. The disk drive of claim 1 wherein the slider includes a slider body that forms a portion of the trailing surface, and wherein at least a portion of the piezoelectric element is constrained by the slider body.

4. The disk drive of claim 3 wherein the piezoelectric element has two opposing surfaces that are constrained by the slider body.

5. The disk drive of claim 3 wherein the piezoelectric element has two opposing pairs of surfaces that are constrained by the slider body.

6. The disk drive of claim 3 wherein the piezoelectric element includes a first volume that is constrained by the slider body and a second volume that is unconstrained by the slider body.

7. The disk drive of claim 6 wherein the ratio of the first volume to the second volume is at least approximately 0.05.

8. The disk drive of claim 1 wherein the slider includes a slider body that forms a portion of the trailing surface, and wherein the piezoelectric element includes an exposed surface that is substantially parallel with the leading surface.

9. The disk drive of claim 1 wherein the slider includes a slider body having an element cavity that completely receives the piezoelectric element, the piezoelectric element having only one exposed surface.

10. The disk drive of claim 1 wherein the piezoelectric element has only one substantially planar exposed surface.

11. A disk drive comprising:
a drive circuitry;
a storage disk having a data surface; and
a slider including
(i) a slider body having a leading surface,
(ii) a trailing surface that is substantially opposite the leading surface,
(iii) a data transducer positioned near the trailing surface, the data transducer magnetically interacting with the storage disk, and
(iv) a piezoelectric element secured to the slider body only on a trailing edge side of the slider, the piezoelectric element having opposing surfaces and a first exposed surface that is approximately parallel to the trailing surface, the opposing surfaces of the piezoelectric element being at least partially constrained by the slider body, the piezoelectric element receiving a driving voltage from the drive circuitry to adjust a distance between the data transducer and the data surface.

12. The disk drive of claim 11 wherein the piezoelectric element forms a portion of the trailing surface.

13. The disk drive of claim 11 wherein the slider body forms a portion of the trailing surface, and wherein at least a portion of the first exposed surface is substantially coplanar with the portion of the trailing surface formed by the slider body.

14. The disk drive of claim 11 wherein the piezoelectric element has two opposing pairs of surfaces that are constrained by the slider body.

15. The disk drive of claim 11 wherein the piezoelectric element includes a first volume that is constrained by the slider body and a second volume that is unconstrained by the slider body.

16. The disk drive of claim 15 wherein the ratio of the first volume to the second volume is at least approximately 0.05.

17. The disk drive of claim 11 wherein the slider body includes an element cavity that completely receives the piezoelectric element, and wherein the piezoelectric element includes exactly one exposed surface.

18. The disk drive of claim 11 wherein the piezoelectric element has only one substantially planar exposed surface.

19. A method for adjusting the distance between a data transducer of a slider and a data surface of a storage disk in a disk drive, the method comprising the steps of:
positioning the data transducer near a trailing surface of the slider;
positioning a piezoelectric element of the slider at least partially within a slider body of the slider only on a trailing edge side of the slider so that the piezoelectric element forms a portion of the trailing surface; and
directing a driving voltage to the piezoelectric element to adjust the distance between the data transducer and the data surface.

20. The method of claim 19 wherein the step of positioning the piezoelectric element includes positioning the slider body to form at least a portion of the trailing surface and positioning one surface of the piezoelectric element to be coplanar with the portion of the trailing surface formed by the slider body.

21. The method of claim 19 wherein the step of positioning the piezoelectric element includes constraining at least two opposing surfaces of the piezoelectric element by the slider body.

22. The method of claim 19 wherein the step of positioning the piezoelectric element includes constraining at least two opposing pairs of surfaces of the piezoelectric element by the slider body.

23. A method for adjusting the distance between a data transducer of a slider and a data surface of a storage disk in a disk drive, the method comprising the steps of:
positioning the data transducer near a trailing surface of the slider;
securing a piezoelectric element of the slider to a slider body of the slider so that the piezoelectric element has two opposing surfaces that are constrained by the slider body, and a first exposed surface that is approximately parallel with the trailing surface; and
directing a driving voltage to the piezoelectric element to adjust the distance between the data transducer and the data surface.

24. The method of claim 23 wherein the step of securing includes positioning the piezoelectric element to form a portion of the trailing surface.

25. The method of claim 23 wherein the step of securing includes positioning the slider body to form a portion of the trailing surface, and positioning the piezoelectric element so that at least a portion of the first exposed surface is coplanar with the portion of the trailing surface formed by the slider body.

26. The method of claim 23 wherein the step of securing includes constraining at least two opposing pairs of surfaces of the piezoelectric element by the slider body.

* * * * *